United States Patent
Moghe et al.

(10) Patent No.: US 10,223,377 B1
(45) Date of Patent: Mar. 5, 2019

(54) EFFICIENTLY SEEDING SMALL FILES WITH CERTAIN LOCALITIES

(71) Applicant: EMC Corporation, Hopkinton, MA (US)

(72) Inventors: Dheer Moghe, Karnataka (IN); Prajakta Ayachit, Maharashtra (IN); Vivek Velankar, Maharashtra (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 747 days.

(21) Appl. No.: 14/666,176

(22) Filed: Mar. 23, 2015

(51) Int. Cl.
*G06F 7/00* (2006.01)
*G06F 17/30* (2006.01)

(52) U.S. Cl.
CPC .. *G06F 17/30221* (2013.01); *G06F 17/30138* (2013.01)

(58) Field of Classification Search
CPC .................................................. G06F 17/30138
USPC ......................................................... 707/790
See application file for complete search history.

(56) References Cited

U.S. PATENT DOCUMENTS

| | | | | |
|---|---|---|---|---|
| 7,478,113 | B1* | 1/2009 | De Spiegeleer | G06F 11/1453 |
| 8,086,445 | B2* | 12/2011 | Wold | G10H 1/0041 704/200 |
| 8,166,012 | B2* | 4/2012 | Reddy | G06F 17/30598 707/705 |
| 8,601,358 | B2* | 12/2013 | Thiesfeld | H03M 13/09 714/763 |
| 9,886,446 | B1* | 2/2018 | Liu | G06F 17/30312 |
| 2008/0263109 | A1* | 10/2008 | Patterson | G06F 17/30159 |
| 2009/0254572 | A1* | 10/2009 | Redlich | G06Q 10/06 |
| 2010/0250497 | A1* | 9/2010 | Redlich | F41H 13/00 707/661 |

* cited by examiner

*Primary Examiner* — Eliyah S. Harper
(74) *Attorney, Agent, or Firm* — Womble Bond Dickinson (US) LLP

(57) ABSTRACT

According to one embodiment, a request for seeding a predetermined number of small files with a predetermined locality in a storage system is received, each of the files to have a predetermined file size. In response to the request, a plurality of segments and fingerprints of the segments are generated. File trees representing the predetermined number of files respectively are generated based on the fingerprints of the segments, each of the files represented by the segments having the predetermined file size. A namespace representing one or more directories of the files is generated based on the file trees, where each of the directories of files satisfies the predetermined locality. The namespace and segments corresponding to the files of one or more directories are written to a storage device of the storage system.

21 Claims, 10 Drawing Sheets

EFFICIENTLY SEEDING SMALL FILES WITH CERTAIN LOCALITIES

FIELD OF THE INVENTION

Embodiments of the present invention relate generally to data storage systems. More particularly, embodiments of the invention relate to efficiently seeding small files with a target locality.

BACKGROUND

Data storage is a critical component for computing. In a computing device, there is a storage area in the system to store data for access by the operating system and applications. In a distributed environment, additional data storage may be a separate device that the computing device has access to for regular operations. In an enterprise environment, the stored data in the storage area of the computing device or additional data storage often access one or more offsite storage devices as a part of a global disaster recover (DR) strategy to protect the entire organization by having one or more copies of data at offsite locations.

The performance of a storage system may be periodically measured against certain benchmarks. In order to measure the performance of the storage system, there are cases where there is a need to populate a large amount of small files to mimic a customer scenario with a specific locality of a particular process or operation of the storage system, such as garbage collection, enumeration operations. A conventional method is to utilize existing storage file system using a corresponding file system protocol. Such an approach has to utilize the entire file system stack, which takes a long period of time in order to create a large number of small files with a specific locality.

In a deduplicated file system, such as Data Domain™ file system from EMC® Corporation, there are two components responsible to manage the files in the system. The first one is directory manager (DM), which is a hierarchical mapping from the path to the inode representing a file. The second one is content store (CS), which manages the content of the file. Each file has a content handle (CH) that is stored in the inode that is created by CS every time the file content changes. Each CH represents a file that is abstracted as a Merkle tree of segments. A file tree can have up to multiple levels, such as 7 levels: L0, . . . , L6. The L0 segments represent user data and are the leaves of the tree. The L6 is the root of the segment tree. Segments from L1 to L6 are referred to as metadata segments or Lp segments. They represent the metadata of a file associated with a file tree. An L1 segment is an array of L0 references. Similarly an L2 is an array of L1 references and so on.

A segment is considered live if it can be referenced by any live content in the file system. The file system packs the segments into containers which are written to disk in a log-structured manner. Each container is structured into sections. The first section is the metadata section and the following sections are referred to as compression regions (CRs). A CR is a set of compressed segments. In the metadata section there are all the references or fingerprints that identify the segments in the container.

A garbage collection is a form of automatic memory management. The garbage collector, or just collector, attempts to reclaim garbage, or resources (e.g., storage resources) occupied by files that are no longer in use by the file system. A garbage collection process of the file system is responsible for enumerating all live segments in the live content handles of the file system. A physical garbage collector traverses segments of all the files simultaneously using a breadth-first approach. A logical garbage collector traverses in a file-by-file basis through the file system in a depth-first approach.

A deduplicating system is optimized for ingesting data at a very high throughput to enable small backup windows. A typical backup system from Data Domain® can ingest data at a throughput of higher than 2 GB/sec, when the data is written through a few big files. In contrast when lots of small files are written the throughout drops to less than 10 MB/sec. This is due to the inherent limitations of the protocol stack and inability of the duplication software storage stack to deal with small files efficiently.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A new scheme is provided where lots of small files can be ingested in a deduplicating system at throughput comparable to the throughout seen while ingesting big files. This is a 100× improvement in the current throughput for small files with the desired locality. According to some embodiments, instead of walking through the entire storage file system stack top down for creating a large number of files (e.g., small-size files), a new approach is to build the files bottoms up, using a data seeding module communicatively coupled to a directory manager of the storage file system. The data seeding module generates data with desired compressibility, anchors/fingerprints them and generates segments, which may be part of a deduplication storage system described further below. While generating data segments, it also generates metadata representing the data segments and a file tree representing each file. The content handles of the file trees are then utilized to create a namespace of the files (e.g., a directory or directories of files). The data segments, as well as, the namespace information are then written to a storage device in a manner that satisfies an intended locality of the files. In one embodiment, the data segments and/or namespace information (e.g., directory pages) are accumulated and configured in a specific configuration that satisfies a target locality before writing the data segments and the namespace information to the storage device as a batch to reduce the number of unnecessary input/output (TO) transactions to the storage device. As a result, the speed of creating such a large number of files with a specific locality and/or compression ratio can be greatly improved. Such files can be subsequently used to measure a performance of a storage operation, such as a garbage collection or enumeration process.

Figure 1:
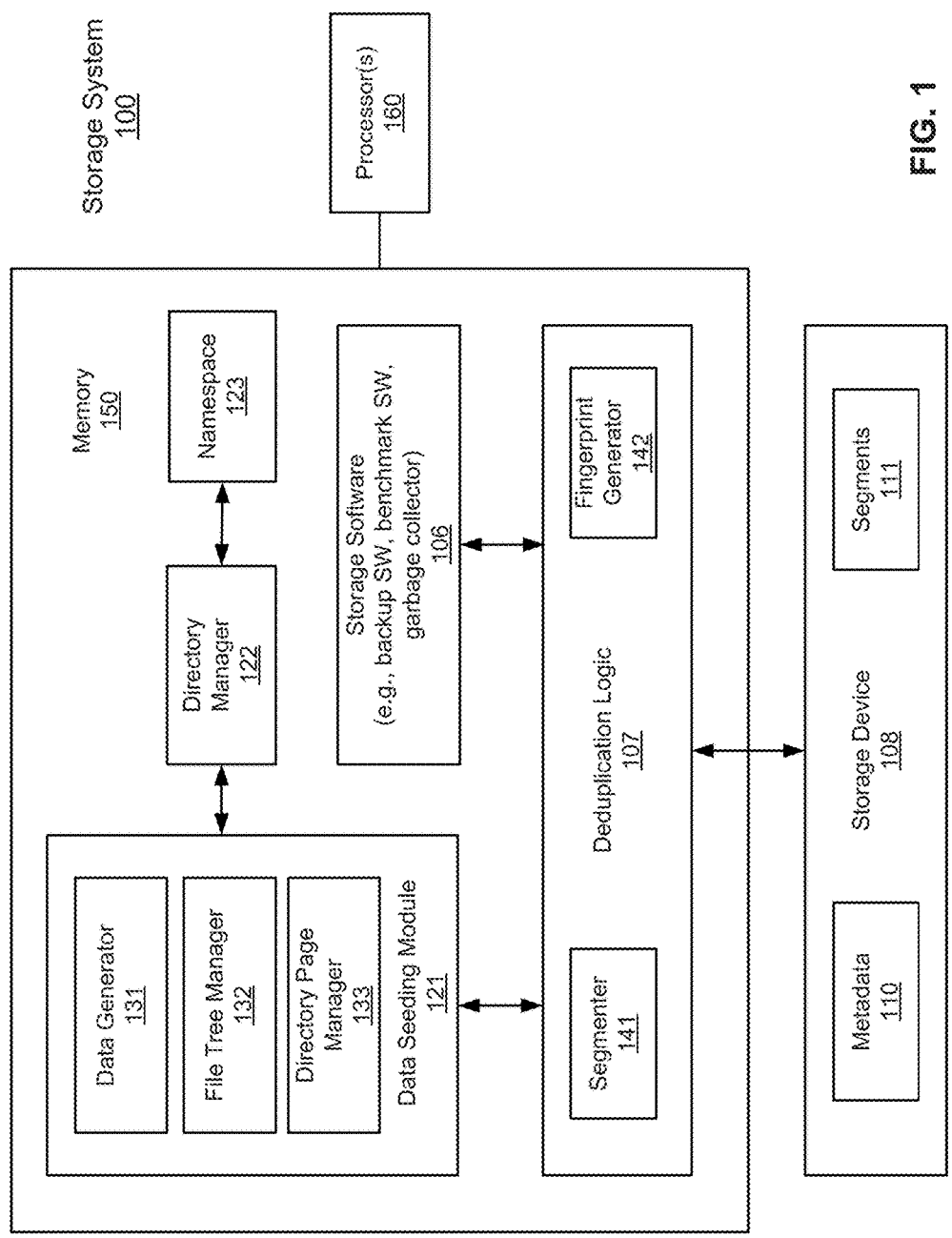
FIG. 1 is a block diagram illustrating a storage system according to one embodiment of the invention.

FIG. 1 is a block diagram illustrating a storage system according to one embodiment of the invention. Referring to FIG. 1, storage system 100 may represent any type of server or a cluster of one or more servers (e.g., cloud servers) to allow a variety of clients to access the data stored therein over a network (not shown). A client may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, a client may be a primary storage system (e.g., local data center) that provides storage to other local clients, which may periodically back up the content stored therein to a backup storage system (e.g., a disaster recovery site or system), such as storage system 100. The network may be any type of networks such as a local area network (LAN), a wide area network (WAN) such as the Internet, a fiber network, a storage network, or a combination thereof, wired or wireless.

For example, storage system 100 may be a storage server used for various different purposes, such as to provide multiple users or client systems with access to shared data and/or to back up (or restore) data (e.g., mission critical data). Storage system 100 may provide storage services to clients or users via a variety of access interfaces and/or protocols such as file-based access protocols and block-based access protocols. The file-based access protocols may include the network file system (NFS) protocol, common Internet file system (CIFS) protocol, etc. The block-based access protocols may include the small computer system interface (SCSI) protocols, Internet SCSI or iSCSI, and Fiber channel (FC) protocol, etc.

In one embodiment, storage system 100 includes, but is not limited to, storage software or storage service engine 106 (e.g., garbage collection logic, etc.) and deduplication logic 107 executed in memory 150 by one or more processors 160, and one or more storage units or devices 108 (e.g., persistent storage device such as hard disks) communicatively coupled to each other. Storage service engine 106 may represent any storage service related components configured or adapted to provide storage services (e.g., storage as a service) to a variety of clients using any of the access protocols set forth above. For example, storage service engine 106 may include backup logic and restore logic. The backup logic is configured to receive and back up data from a client and to store the backup data in storage device 108. The restore logic is configured to retrieve and restore backup data from storage device 108 back to a client.

Storage device 108 may be implemented locally (e.g., single node operating environment) or remotely (e.g., multi-node operating environment) via interconnect, which may be a bus and/or a network (e.g., a storage network). Storage device 108 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Storage device 108 may be located locally or remotely accessible over a network.

In response to a data file to be stored in storage device 108 (e.g., from a storage file system), according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner in storage device 108 as part of segments 111. The metadata, such as metadata 110, may also be stored in storage device 108, such that files can be accessed independent of another storage device. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over the input data, breaking the data stream into smaller variable length units called segments through a process called anchoring and by processing digest information associated with each segment through a process called fingerprinting and mapping the identical segments to a single instance of the data segment. In such systems, an index table of unique digests is created to find commonality among the data set. When a deduplicated data segment is updated with a new content, a new data segment is created containing the new updated content. Mapping of the deduplicated segment is then changed to point to the new data segment and the deduplicated segment no longer points to the single copy of the data.

In other implementation of deduplication (as compared to variable length segment based deduplication described above) data deduplication can operate at a file or a block level. File deduplication eliminates duplicate files (as in the example above), while block deduplication processes blocks within a file and saves unique copy of each block. As compared to file and block based deduplication, a variable length segment based deduplication offers the most deduplication efficiency as the deduplication algorithm is immune to shifts in data stream. For example, if only a few bytes of a document or presentation or a file are changed, only the changed segments are saved. The changes made to few bytes of the document or the presentation or the file do not constitute an entirely new file. The sharing of file system data segments conserves data storage for storing files in a data storage system. The snapshot copy facility is a space saving technology that enables sharing of file system data blocks among versions of a file. On the other hand, a deduplication facility enables the sharing of file system data segments within a file, among versions of a file, between versions of a file and unrelated files, and among unrelated files. Therefore, the deduplication facility eliminates from the data storage system any file system data segments containing duplicative data content.

According to one embodiment, system 100 includes a data seeding module 121 executed in memory 150 and communicatively coupled to directory manager 122 and deduplication logic 107. Data seeding module 121 is configured to seed a set of files with a specific file size distribution, in a particular directory configuration, and with a particular locality. The set of files may be stored in storage device 108 as part of segments 111 and metadata 110. Directory manager 122 and namespace 123 may be implemented as part of a file system.

In one embodiment, data seeding module 121 includes data generator 131, file tree manager 132, and directory page manager 133. When a request for seeding a set of files having certain characteristics (e.g., a predefined compression ratio, a number of files, an average file size, and/or a target locality) is received, for example, via a user interface or an application programming interface (API), data generator 131 is configured to generate a set of data with optional predefined compression ratio. Data generator 131 then invokes segmenter 141 of deduplication logic 107 to segment the data set into data segments and invokes fingerprint generator 142 of deduplication logic 107 to generate a fingerprint (e.g., metadata) for each of the data segments. Data generator 131 generates from the data set enough data segments with their respective fingerprints to satisfy the predefined number of files and the predefined file size as specified in the request.

Once the data segments and their metadata have been generated, according to one embodiment, file tree manager 132 generator a file tree using the fingerprints of the segments for each of the files, where each file tree represents one of the files to be seeded. Each file tree includes one or more levels of nodes or segments in a hierarchical structure. Each file tree includes a root node representing a content handle of the file, one or more levels of intermediate nodes directly or indirectly referenced by the root node, and multiple leaf nodes that represent the actual data segments directly or indirectly referenced by one or more intermediate nodes. A parent node includes a fingerprint of content of each child node or child nodes it references. Thus, only the leaf node contain the actual data segment, while any other nodes, either being a root node or intermediate node, contains fingerprints of its respective child nodes.

Once the file trees have been generated, in one embodiment, directory page manager 133 is configured to populate one or more directory pages (also referred to as directory manager pages or DM pages) by accumulating enough content handles of the file trees (e.g., root nodes of the file trees). Each directory page contains content handles of file trees based on the specific directory page size that is compatible with a particular file system of system 100. The number of file trees represented in each directory page and the number of directory pages required are also determined based on the specific directory configuration that is derived from the request, such as, for example, a number of files in the same directory and the locality of the directory, etc. Once the directory pages have been configured and the content handles have been accumulated, directory page manager 133 communicates with directory manager 122, for example, via an API, to request directory manager 122 to create namespace 123 representing the directory pages that have been configured. Directory page managers 133 provides the accumulated content handle of file trees to directory manager 122, as well as other directory parameters (e.g., directory names, directory locations, etc.) to allow directory manager to create the corresponding directories, i.e., namespace 123.

According to one embodiment, directory manager 122 returns, for example, via the API, the namespace information describing namespace 123 to directory page manager 133. The namespace information and the actual data segments are then written, for example, as one or more batches) to storage device 108 as part of metadata 110 and segments 111. The namespace information and the actual data segments are stored in a manner (e.g., timing and/or storage locations) that satisfies the requested or target locality, which may be specified in the request for seeding data. Since the files and their respective metadata are written in batches or an accumulated fashion to satisfy the required locality, the number of individual IO transactions to storage device 108, as well as any unnecessary file system processes, can be greatly reduced. As a result, the efficiency of the data seeding operations can be greatly improved.

Note that for the purpose of seeding data, deduplication logic 107 is optional. Segmenter 141 and fingerprint generator 142 may be integrated with data seeding module 121 or data generator 131. Alternatively segmenter 141 and fingerprint generator 142 can be separate modules that are communicative coupled to data seeding module 121 via an API. Furthermore, data seeding module 121 may also be integrated as part of a file system having directory manager 122 therein, where data seeding module 121 can be accessed via a user interface by a user or it can be invoked via an API maintained by the file system.

Note that some or all of the components as shown and described above (e.g., data seeding module 121, deduplication logic 107) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2A:
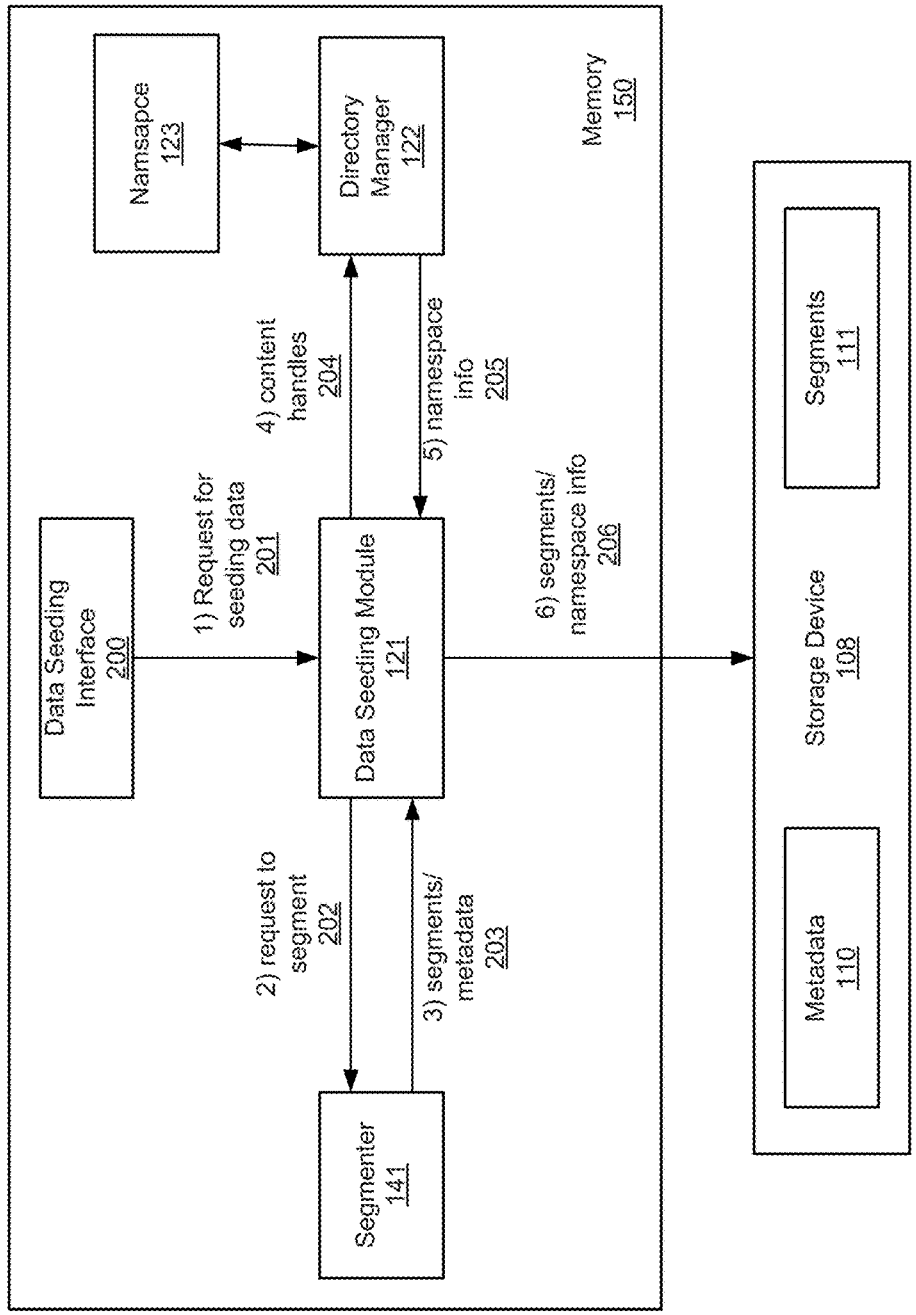
FIG. 2A is a transaction diagram illustrating a process of seeding files with a particular locality according to one embodiment of the invention.

FIG. 2A is a transaction diagram illustrating a process of seeding files with a particular locality according to one embodiment of the invention. The system as shown in FIG. 2A may be implemented as part of the system as shown in FIG. 1. Referring to FIG. 2A, in one embodiment, data seeding module 121 receives a request from data seeding interface 200 for seeding data via path 201. The interface 200 may be a user interface through which a user can initiate a process of seeding files or alternatively, interface 200 may be an API to receive the request from another application or a remote device over a network. The request may include information specifying a number of files to be seeded, an average file size, a target compression ratio of the files, and/or a target locality of the files, etc.

In response to the request, data seeding module 121 (e.g., data generator 131) generate a data set, such as a large piece of artificial data, in memory. In one embodiment, the data set is created with a certain data pattern to satisfy the target data compression ratio that is specified in the request. In one embodiment, a predetermined algorithm that is specifically configured for generating data with the target compression is utilized. In another embodiment, a third party tool or function may be invoked to generate such data set with a particular data compression ratio. Typical compression algorithms look for common patterns of data in the set that is getting compressed and only store one pattern eliminating the redundant copy. For example, if one wants to generate 2× compressibility (e.g., data reduces to half after compression), it generates half the data randomly and add zeroes to the rest of the data set. The zeroes will get compressed completely thereby giving you 2× compression.

Once the data set with the target compression has been created, data seeding module 121 provides the data set to deduplication logic 107 via path 202 to allow deduplication logic 107 to segment the data set into data segments using a predetermined segmenting or chunking algorithm. In addition, deduplication logic 107 generates the fingerprints of the data segments, for example, by hashing content of the data segments using a predetermined hash algorithm. Data seeding module 121 receives the data segments and their fingerprints from deduplication logic 107 via path 203. In response to the data segments and their fingerprints, data seeding module 121 constructs a file tree for each of the files to be seeded, where the number of the files to be seeded may be specified in the request received from interface 200 via path 201.

As described above, a file tree may include multiple levels of nodes in a hierarchical structure, where a parent node contains the metadata or fingerprints of its child node or nodes. Thus, only the leaf nodes represent the actual data segments. A root node represents a content handle of the corresponding file. In one embodiment, a file tree can be represented by a Merkle tree. A Merkle tree is a tree in which every non-leaf node is labelled with the hash of the labels of its children nodes. Hash trees are useful because they allow efficient and secure verification of the contents of large data structures. Hash trees are a generalization of hash lists and hash chains.

In a deduplicated file system, a file may be represented in a file tree having one or more levels of segments in a multi-level hierarchy. In this example, there are seven levels L0 to L6, where L6 is the root level, also referred to as a top parent level (e.g., content or file handle). More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. Thus, L1 to L6 are segments only contain metadata of their respective child segments(s), referred to herein as Lp segments, as shown in FIG. 2B.

Figure 2B:
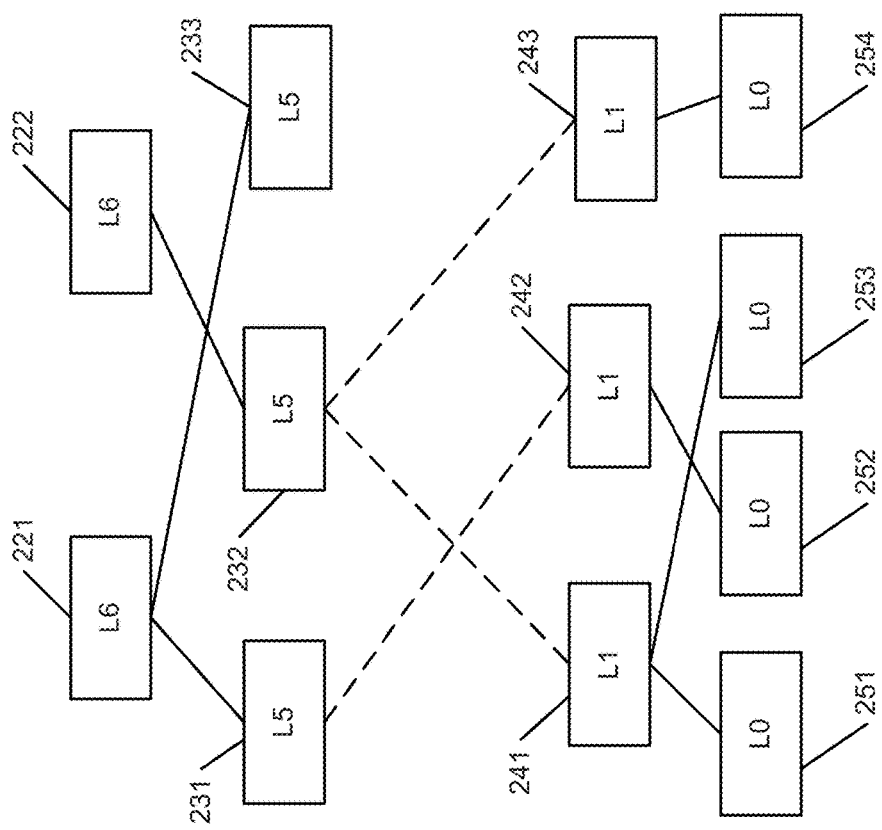
FIG. 2B is a block diagram illustrating a data structure of a file tree according to one embodiment of the invention.

Referring to FIG. 2B, in this example, segment 221 includes a representation (e.g., fingerprint) of fingerprints of segments 231 and 233, and segment 222 includes a representation (e.g., a fingerprint) of fingerprints of segments 232-233, and so on. Some of the segments, such as segment 233, are referenced by one or more parent level segments. Thus, segments 221-222, 231-233, and 241-243 only contain data representing the metadata of their respective child segments. Only segments 251-254 contain the actual user data.

Referring back to FIG. 2A, once the file trees have been constructed, data seeding module 121 configures or provisions one or more directory pages of a namespace (e.g., namespace 123) of a file system representing one or more directories of the files to be seeded based on the content handles of the file trees. The directory pages may be configured based on the size of a directory page and the number of directory pages that can satisfy the target locality of the files to be seeded.

In one embodiment, the namespace of a file system is organized in a hierarchical data structure containing a layer of root page (where a page is also referred to as a node), a layer of one or more intermediate pages, and a layer of a plurality of leaf pages, and where each leaf page contains one or more data blocks and each data block containing a namespace entry corresponding to a file or a directory of a file system of the deduplicating storage system. The hierarchical structure may be implemented in a form of a namespace tree such as a B+ tree.

A B+ tree is an nary tree with a variable but often large number of children per node. A B+ tree consists of a root, internal nodes and leaves. The root may be either a leaf or a node with two or more children. The primary value of a B+ tree is in storing data for efficient retrieval in a block-oriented storage: context, in particular, file systems. This is primarily because unlike binary search trees, B+ trees have very high fan-out (number of pointers to child nodes in a node, typically on the order of 100 or more), which reduces the number of I/O operations required to find an element in the tree.

Referring back to FIG. 2A, once the directory pages have been configured to satisfy a particular or predetermined locality (e.g., how many files in a directory and how many directories that satisfy the target locality), data seeding module 121 provides at least the content handles of the file trees to directory manager 122 via path 204 requesting directory manager 122 to create a particular namespace (e.g., particular directory or directories with certain directory and/or file attributes). In one embodiment, data seeding module 121 communicates with directory manager 122 via an API. In response, directory manager 122 creates namespace 123 based on the information provided by data seeding module 121 and returns the namespace information back to data seeding module 121 via path 205. In one embodiment, the namespace information includes the leaf nodes of the namespace tree.

Data seeding module 121 then writes the data segments (e.g., L0 segments of the file trees) and the namespace information (e.g., leaf pages or nodes of the namespace tree) to storage device 108 as part of metadata 110 and segments 111 via path 206. In one embodiment, the data segments and the namespace information are written in the same IO stream, such that the locality of the data segments and the locality of the namespace information are maintained. The data segments and the namespace information of multiple files are written in batches to reduce the number of IO transactions to storage device 108, where a conventional method would have written in a file-per-file basis that requires higher amount of IO transactions and takes a longer period of time.

As described above, there is a segment locality (referred to as Lp locality) and namespace locality (referred to as DM locality) that need to maintain. For big files the locality of Lp segments refers to the locality of Lps for a given file. For small files the locality of Lps for a given file is relatively good. The locality of Lps relates to files within a directory. The locality of small files within a directory is important while enumerating files in a directory during logical garbage collection (GC). Typically with archiving workloads, files in a directory represent good temporal locality and therefore a good small file Lp locality also helps in emulating archiving type of workload.

Entities written together have locality in time and therefore are defined to have a temporal locality. On the other hand, entities which are present on the disk together have a spatial locality. If for example all the files in a directory are written together (and also stored together), have both good temporal and spatial locality. This is what the archiving workload tend to have since they tend to create new directories which correspond to the time of archiving and write a bunch of files together in them.

Worst Lp locality for small files would exist in environment where the files in a directory are written at different times and exhibit little or no temporal locality. This in some sense will create a worst case environment for logical enumeration. Over a period of time, in a home directory environment, one can expect to see worst case locality. With Logical Enumeration, GC ends up enumerating all the files in a directory one after the other. If there is good temporal locality for small files within a directory, the enumeration would benefit from caching. On the other hand in the worst locality for small files, enumeration of every small file will cause disk I/Os to fetch Lps. For GC, the files can also be enumerated physically by scanning the storage subsystem looking for all the live L6 segments in the system and scanning the rest of the Merkle tree for all the live files simultaneously. This is referred to as Physical GC and is more efficient compared to logical GC, which enumerates files by traversing files one at a time.

For Physical GC the locality of Lps within a directory is irrelevant since physical GC works by enumerating the Lp tree in a breadth first manner. However to benchmark the effectiveness of Physical GC over Logical GC and to also generate datasets which correspond to different access patterns (e.g., archiving, home directories), it is desirable to be able to generate nearline datasets with different Lp locality.

Today even with Physical GC, the DM pages are enumerated in the key order with the B+ tree. The locality of the namespace (also referred to as the locality of DM later) is determined by the locality of the pages in the B+ tree when iterated over in the key order. With a typical archiving workload, where data are added to a directory and in an "append" fashion, it is likely to obtain a good DM locality. However with a home directory, over a period of time a poor DM locality is observed. This again refers to the temporal and spatial locality. For archiving workloads we will see good locality for the files within a directory since they are written together. While in home directory situation where random files get modified within a directory the locality of files within a directory would be poor. It is important to note that good Lp locality and good DM locality generally go hand in hand.

Figure 3:
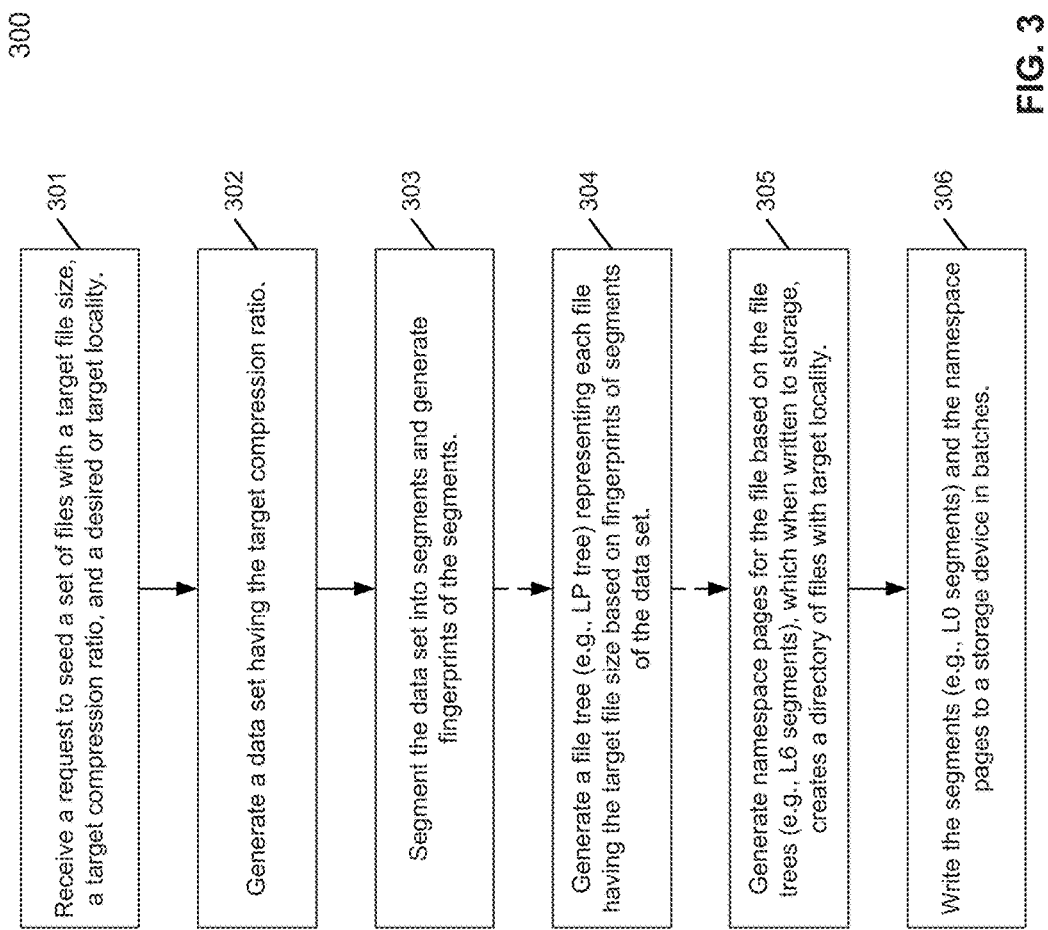
FIG. 3 is a flow diagram illustrating a process for seeding data according to one embodiment of the invention.

FIG. 3 is a flow diagram illustrating a process for seeding data according to one embodiment of the invention. Process 300 may be performed by processing logic which may include software, hardware, or a combination thereof. For example, process 300 may be performed by data seeding module 121 as described above. Referring to FIG. 3, at block 301, processing logic receives a request for seeding a set of files.

In response to the request, at block 302, processing logic generates a data set in memory with certain characteristics dependent upon the compression requirement, which may be specified in the request. In one embodiment, the data set includes a repeated data pattern that is determined based on the desired compression. At block 303, the data set is segmented into data segments and fingerprints of the data segments are generated, for example, by invoking certain functionalities of deduplication logic as described above. At block 304, processing logic constructs or provisions the desired number of files from the data segments, where the number of files may be specified in the request. For each of the files, a file tree is generated using the fingerprints of the corresponding data segments. At block 305, processing logic generates a namespace based on the desired locality of the files using the content handles of the file trees. At block 306, the data segments and the namespace information are written to a storage device, such that the data segments and the namespace information stored therein have the desired locality.

Note that certain portions of the operations as shown in FIG. 3 may be performed via one or more threads executed substantially concurrently. For example, operations of blocks 301-303 may be performed via a first thread; operations of block 304 may be performed via a second thread; and operations of blocks 305-306 may be performed via a third thread. In one embodiment, these operations may be performed in a pipelined fashion.

Figure 4:
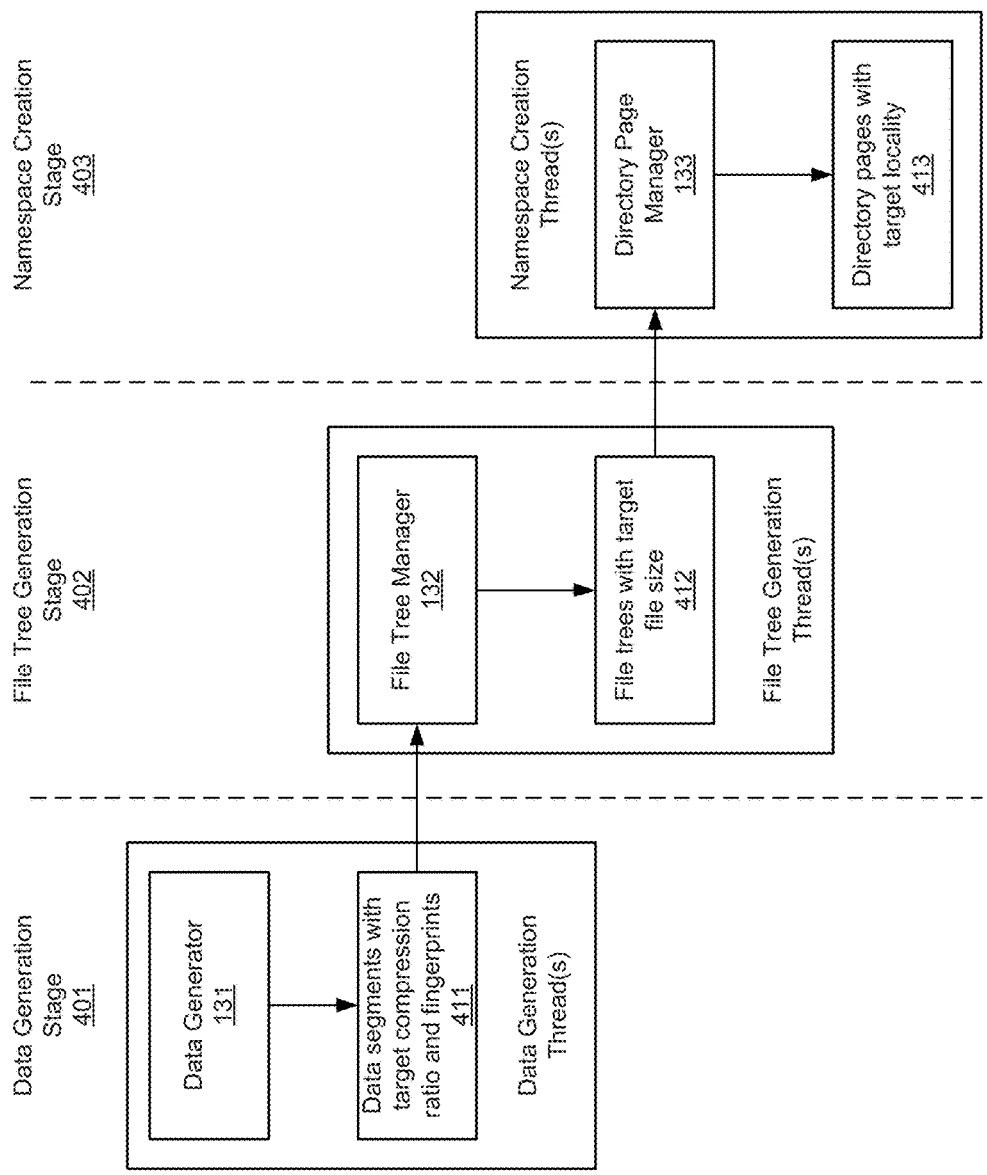
FIG. 4 is a block diagram illustrating stages of processes for seeding data according to one embodiment of the invention.

FIG. 4 is a block diagram illustrating stages of processes for seeding data according to one embodiment of the invention. Referring to FIG. 4, in this embodiment, the operations are divided into three pipeline stages: 1) data generation stage 401; 2) file tree generation stage 402; and 3) namespace creation stage 403. Each stage may be carried out via one or more threads executed substantially concurrently. During data generation stage 401, data generator generates a set of data, segments or invoke a duplication logic to segment the data set into data segments, and generates the fingerprints of the data segments 411. This stage of the pipeline will generate data with desired compressibility and the results would be stored in a memory buffer. For compressibility the processing logic uses an algorithm to repeat the pattern depending on the desired compressibility. These operations may be performed using a single thread.

Figure 5:
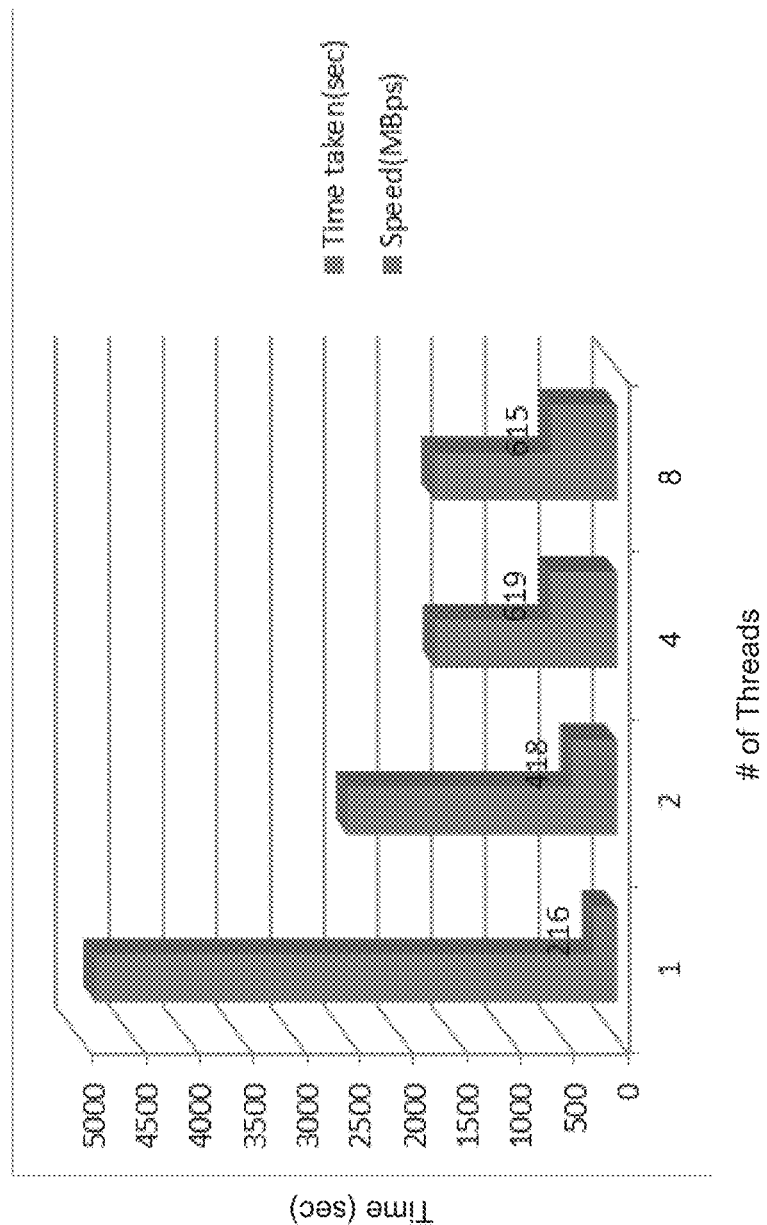
FIG. 5 is a chart diagram illustrating statistics of data seeding processes according to one embodiment of the invention.

During file tree generation stage 402, file tree manager 132 generate file trees 412 based on the fingerprints of the data segments 411 that are generated by previous pipeline stage 401. This operation may be carried out by multiple threads dependent upon the available processing resources. Data generation stage 401 would be the source for this stage. Data would be anchored and fingerprinted and once enough L0 refs have been accumulated (based on file-size), L1 and L6 references are generated. In one embodiment, for a relatively small file, only L1 and L6 are needed since for typical small file the span does not exceed beyond the span for L1 which is 4 MB. Output from this stage would be the content handle which would be inserted in the namespace and is input for the next stage 403 of the pipeline. During namespace creation stage 403, directory page manager 133 configures directory pages that satisfy the desired locality 413 based on content handles of file trees 412. The multiple threads may be configured and executed coherently in such way that the operations of a pipeline stage are performed only after the results of a previous pipeline stage become available. The speed and efficiency of the data seeding operations can vary be depending upon the number of threads utilized, as shown in FIG. 5. FIG. 5 describes the rate at which small files can be created as we increase number of threads. We do see near linear scaling till four threads and after that it tapers off due to resource contention etc. In this example as shown in FIG. 5, the number of threads refers to the number of parallel instances of file seeders. Each instance may have its own 2-3 threads as shown in FIG. 4.

Figure 6:
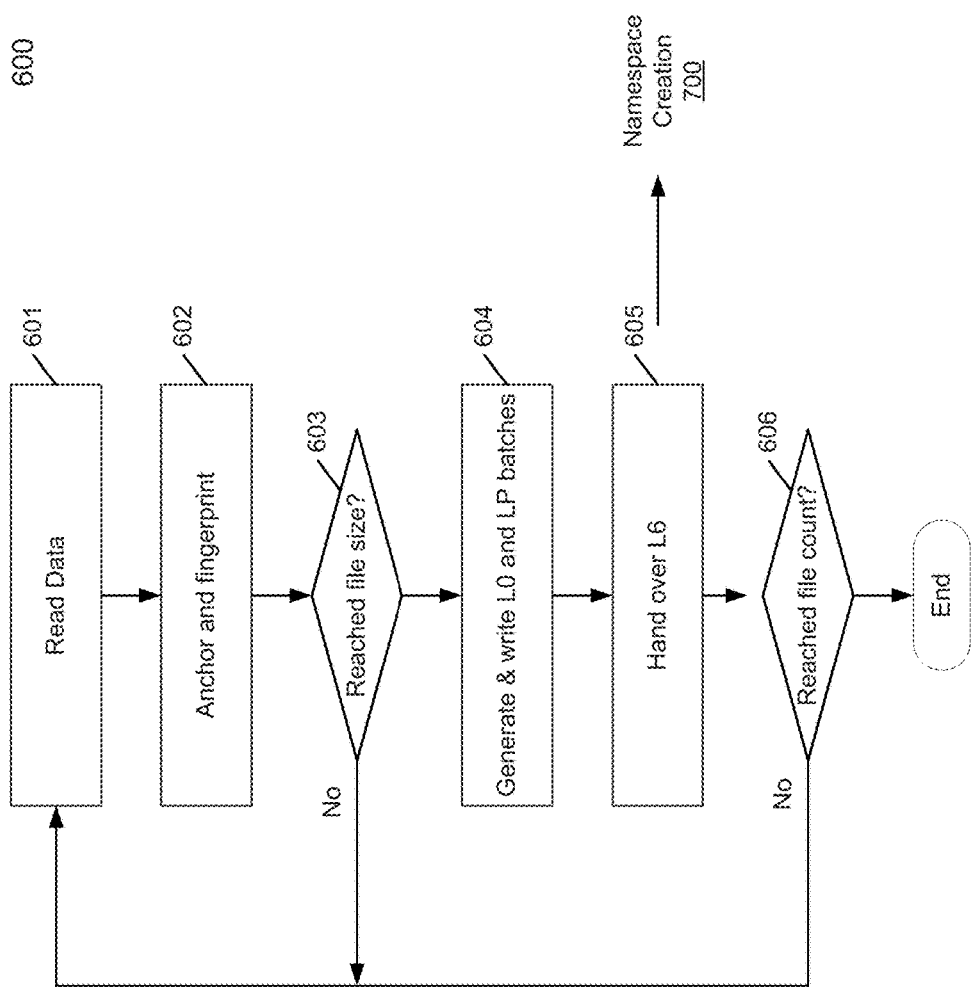
FIG. 6 is a flow diagram illustrating a process for seeding data according to another embodiment of the invention.

FIG. 6 is a flow diagram illustrating a process for seeding data according to another embodiment of the invention. Process 600 may be performed by processing logic which may include software, hardware, or a combination thereof. For example, process 600 may be performed by data seeding module 121 as described above. Referring to FIG. 6, at block 601, in response to a request for seeding a predetermined number of files, processing logic generates a data set (e.g., a large set of data) in a memory buffer and reads the data from the memory. The data set may be generated with a certain compression as desired and specified by the request. At block 602, processing logic anchors and segments the data into data segments using a predetermined segmenting or chunking algorithm. Processing logic further generates a fingerprint for each of the data segments. The data segments are then selected to construct files based on a file size specified by the request at block 603.

Figure 7:
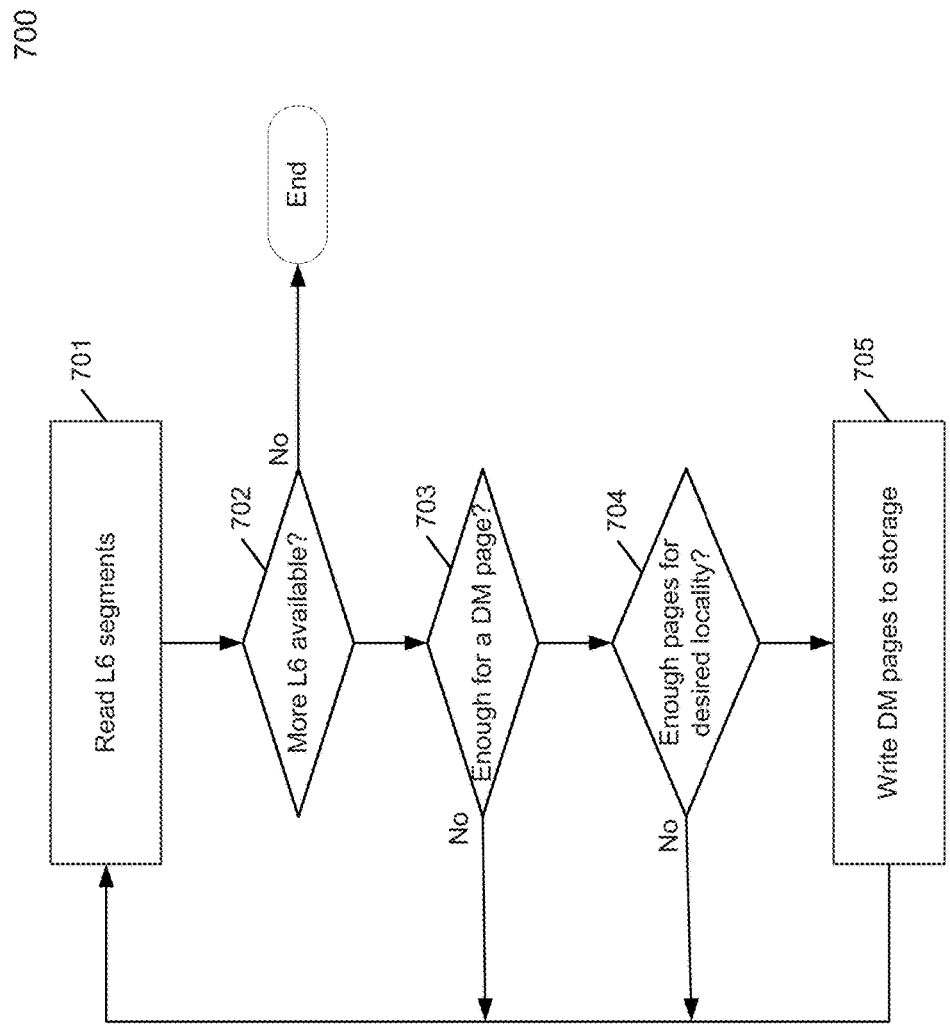
FIG. 7 is a flow diagram illustrating a process for seeding data according to another embodiment of the invention.

Once enough segments are accumulated to form a file with the desired file size, a file tree is generated at block 604, including L0 segments (e.g., actual data segments) and L6 segments (e.g., content handles). The L0 and Lp segments are then written to a storage device in batches. At block 605, the L6 segments, i.e., the content handles of the file trees are utilized to create a namespace, which may be performed as part of namespace creation process 700 as shown in FIG. 7. The above operations may be performed iteratively until the required number of files have been generated and their namespaces are generated at block 606. Note that operations of blocks 601-603 may be performed as part of data generation stage 401; operations of block 604 may be performed as part of file tree generation stage 402; and operations of block 605 and process 700 may be performed as part of namespace creation stage 403 as described above.

Namespace generation stage would take the input from the file tree generation stage in the form of content-handles and will write them out in the B+ Tree. The logic is fairly simple and based on the desired fan out for a directory. The processing logic is to first accumulate enough L6 handles to fill up a directory page, where the size of a directory page depends on the specific file system at the point in time. Once we have a page worth of L6 segments we will check if there are enough L6 segments to generate a batch of L6 segments with desired locality. This will be determined by a combination of the average file size requested.

For example, take the case when the desired file size is 100 kilobytes (KB) and the desire is to create B+ Tree with worst locality. Also assume that we will generate directories with about 100 files in it. This means that we will fill up a directory page (assuming sized 64K) after writing 100 files. Since the average file size is 100K, with 100 files we would be writing 100*100K=10 megabytes (MB) of data. For the worst locality, we can just insert a 64 KB page with the 10 MB of data. This will ensure that directory pages get no or very poor locality.

Now take the case when the desired file size is 100 KB and the desire is to create B+ Tree with best locality. For the best locality, we can cache about 100 MB of pages and write them out together. These would generate about 10 full containers (assuming 2× compression on directory pages) and one partial container. A container refers to a unit in which data is written to a disk for a certain size, such as, for example, approximately 4.5 MB.

When logical contiguous directory pages are written together we get good locality. If logically contiguous directory pages are written far apart in time we get poor locality. The above two paragraphs are creating scenarios to enable these behaviors. This scheme also enables one to control the directory locality. The amount of batching for the directory pages allows a user to control the locality of directory pages since it effectively controls the degree of intermixing with user data.

FIG. 7 is a flow diagram illustrating a process for seeding data according to another embodiment of the invention. Process 700 may be performed by processing logic which may include software, hardware, or a combination thereof. For example, process 700 may be performed by data seeding module 121 as part of the namespace creation process as described above. Alternatively, process 700 may be performed by a directory manager, where the directory manager receives the L6 segments from the data seeding module. Referring to FIG. 7, at block 701, processing logic reads the L6 segments, which may be provided by the file tree generation stage and if no more L6 segments the process ends in the current thread. The L6 segments are accumulated at block 703 to form a directory page. In one embodiment, each L6 segment is 128 bytes and a directory page is 1 KB then it would be able to fit 8 L6 segments in a directory page. At block 704, processing logic determines whether there are enough directory pages for the desired locality. For example, considering the best locality, if a container (unit of storage in which data is packed and written to a disk) is 1 MB and a directory page is 1 KB we will need 1000 directory pages to get the best locality. If there are enough directory pages for the desired locality, at block 705, the directory pages are then written to the storage device; otherwise, the above operations are iteratively performed.

Figure 8:
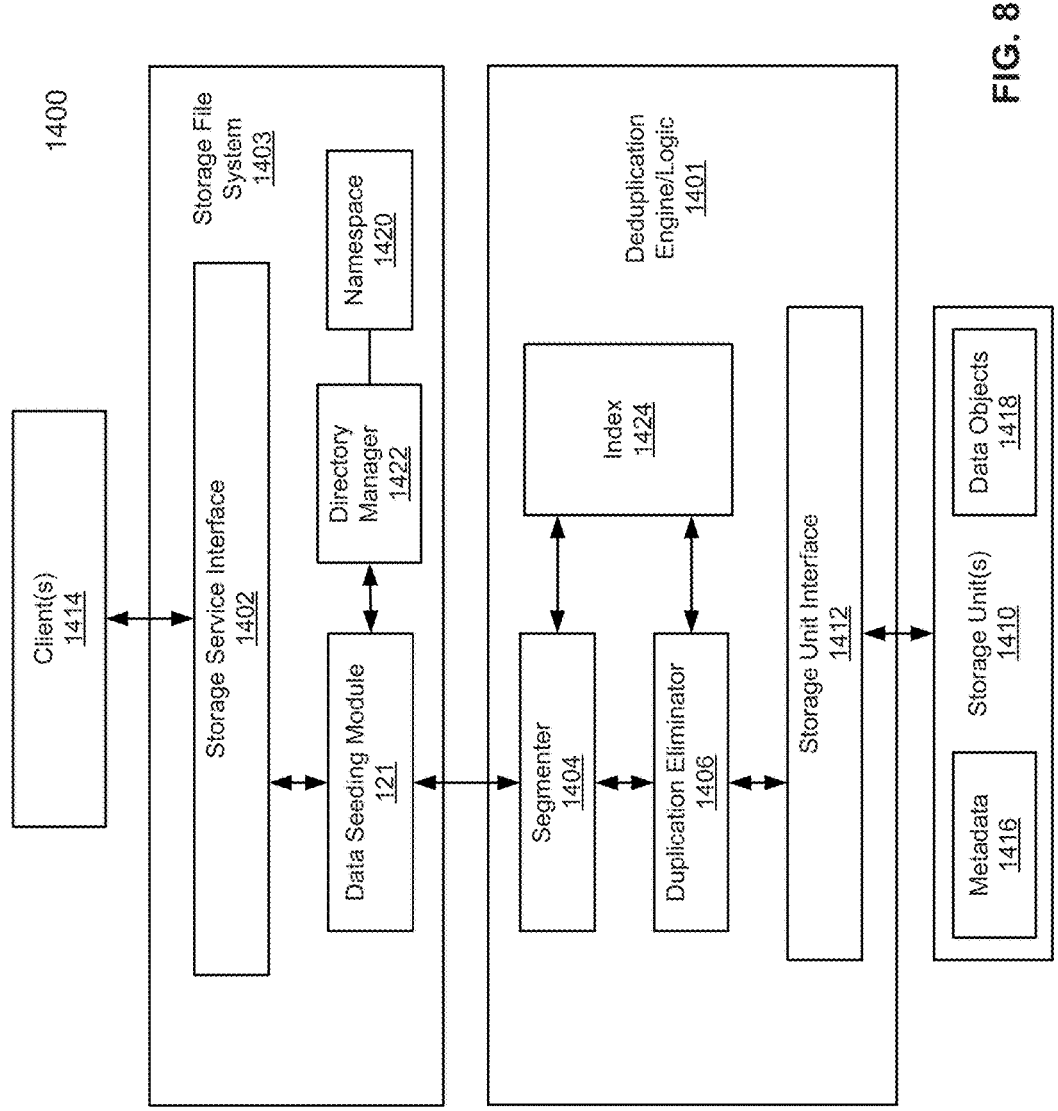
FIG. 8 is a block diagram illustrating a deduplicated storage system according to one embodiment of the invention.

FIG. 8 is a block diagram illustrating a deduplication storage system according to one embodiment of the invention. For example, deduplication storage system 1400 may be implemented as part of a deduplication storage system as described above, such as, for example, storage system 100 of FIG. 1 as described above. In one embodiment, storage system 1400 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1400 may have a distributed architecture, or all of its components may be integrated into a single unit. Storage system 1400 may be implemented as part of an archive and/or backup system, or a disaster recovery system, such as a deduplicating storage system available from EMC® Corporation of Hopkinton, Mass.

In one embodiment, storage system 1400 includes deduplication logic 1401 interfacing one or more clients 1414, via file system 1403, with one or more storage units or devices 1410 storing metadata 1416 and data objects 1418. Clients 1414 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1410 may be implemented locally (e.g., single node operating environment) or remotely (e.g., multi-node operating environment) via an interconnect, which may be a bus and/or a network (e.g., a storage network). In one embodiment, one of storage units 1410 operates as an active storage to receive and store external or fresh user data from a client (e.g., an end-user client or a primary storage system associated with one or more end-user clients), while the another one of storage units 1410 operates as a target storage unit to periodically archive data from the active storage unit according to an archiving policy or scheme.

Storage units 1410 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1410 may also be combinations of such devices. In the case of disk storage media, the storage units 1410 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1416, may be stored in at least some of storage units 1410, such that files can be accessed independent of another storage unit. Metadata of each storage unit includes enough information to provide access to the files it contains. In one embodiment, metadata may include fingerprints or representatives contained within data objects 1418, where a data object may represent a data segment (also referred to as a data chunk), a compression region (CR) of one or more data segments, or a container of one or more CRs. Fingerprints are mapped to a particular data object via metadata 1416, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1416 may include a file name, a storage unit identifier (ID) identifying a storage unit in which the segments associated with the file name are stored, reconstruction information for the file using the segments, and any other appropriate metadata information. Metadata 1416 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment, one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 1403 includes file service interface 1402, system control logic (not shown), directory manager 1422, and namespace 1420. Deduplication logic 1401 includes segmenter 1404 (also referred to as a segmenting module or unit), duplicate eliminator 1406, and storage unit interface 1412. Storage system 1400 further include data seeding module 121 communicatively coupled to directory manager 1422 and deduplication logic 1401 for seeding data, where data seeding module 121 may include a data generator, a file tree manager, and a directory page manager performing the operations as described throughout this application.

The file system control receives a file or files (or data item(s)) via file service interface 1402, which may be part of a file system namespace 1420 of file system 1403 associated with the deduplication logic 1401. The file system namespace 1420 refers to the way files are identified and organized in the system. An example is to organize the files hierarchically into directories or folders, which may be managed by directory manager 1422. File service interface 1412 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 1404 and the file system control. Segmenter 1404, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, the file system control, also referred to as a file system manager, processes information to indicate the segment(s) association with a file. In some embodiments, a list of fingerprints is used to indicate segment(s) associated with a file. The file system control passes segment association information (e.g., representative data such as a fingerprint) to index 1424. Index 1424 is used to locate stored segments in storage units 1410 via storage unit interface 1412. In one embodiment, index 1424 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 1424 maps a fingerprint of a segment to a container identifier identifying a container that contains the corresponding segment.

In one embodiment, index 1424 includes a persistent hash-table of segment-IDs keyed either by the digest of the data stored in the segment or by the deduplication key of the data stored in the segment. The index 1424 need not contain entries for every data segment in the deduplication domain, but the effectiveness of deduplication is a function of the number of entries stored in the index 1424. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 1424) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplicate eliminator 1406, also referred to as a segment store, identifies whether a newly received segment has already been stored in storage units 1410. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1410 that make up the file. Segments are then packed by a container manager (which may be implemented as part of storage unit interface 1412) into one or more storage containers stored in storage units 1410. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 1402 is configured to communicate with the file system control to identify appropriate segments stored in storage units 1410 via storage unit interface 1412. Storage unit interface 1412 may be implemented as part of a container manager. The file system control communicates (e.g., via segmenter 1404) with index 1424 to locate appropriate segments stored in storage units via storage unit interface 1412. Appropriate segments are retrieved from the associated containers via the container manager and are used to construct the requested file. The file is provided via interface 1402 in response to the request. In one embodiment, the file system control utilizes a tree (e.g., a segment tree obtained from namespace 1420) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 1400 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 1401) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
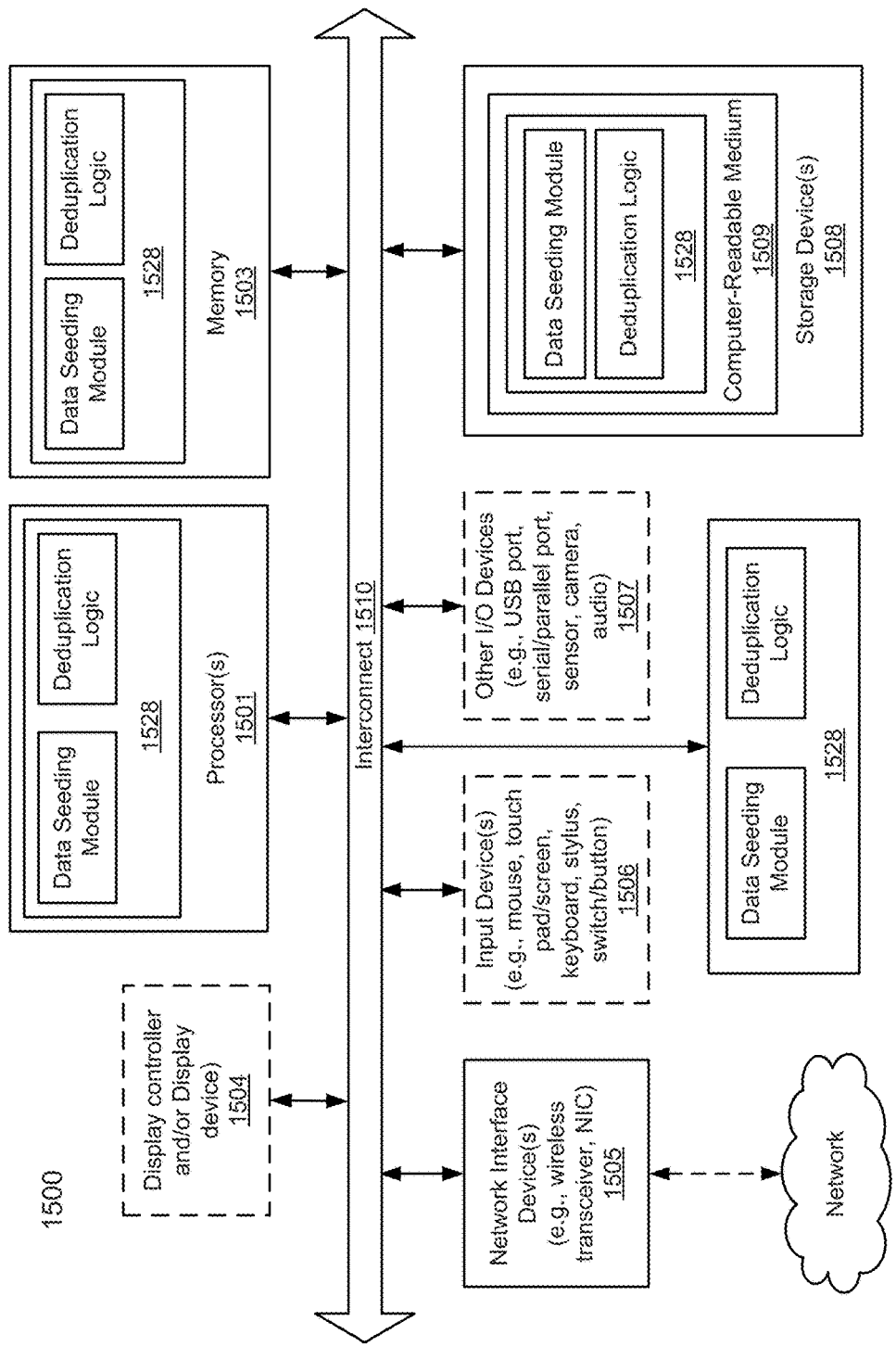
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for efficiently seeding a large number of small files with localities in a storage system, the method comprising:
   receiving a request for seeding a predetermined number of files with a predetermined locality in a storage system, each of the files to have a predetermined file size;
   in response to the request, generating, by a segmenter executed by a processor, a plurality of segments and generating fingerprints of the segments;
   generating by a file tree manager executed by the processor a plurality of file trees representing the predetermined number of files respectively based on the fingerprints of the segments, each of the files represented by the segments having the predetermined file size;
   creating, by a directory page manager executed by the processor, a namespace representing one or more directories of the files based on the file trees, wherein each of the directories of files satisfies the predetermined locality; and
   writing the namespace and the segments corresponding to the files of one or more directories in a same I/O stream to a storage device of the storage system so to maintain a locality of the segments and a locality of the namespace, and so as to reduce the number of input/output transactions to the storage system such that the predetermined number of files can be written at a higher throughput than if written without seeding the files.

2. The method of claim 1, wherein generating a plurality of segments comprises:
   generating a data set with a pattern so that the data set has a predetermined compression ratio, which is determined based on the request; and
   segmenting the data set using a predetermined segmenting algorithm to generate the plurality of segments.

3. The method of claim 2, wherein the segments are generated from the data set to constitute the predetermined number of file, each having the predetermined file size.

4. The method of claim 1, wherein each file tree comprises a plurality of nodes in a hierarchical structure having a plurality of levels, including a root node, one or more levels of intermediate nodes referenced by the root node, and a plurality of leaf nodes referenced by at least a portion of the intermediate nodes, wherein leaf nodes contain actual data of segments, and wherein the root node and the intermediate nodes contain metadata of their respective child nodes.

5. The method of claim 4, wherein each root node represents one of the files, and wherein the root nodes are used to create a namespace of the files via a directory manager of a storage file system.

6. The method of claim 4, wherein creating a namespace representing one or more directories of the files based on the file trees comprises:
   creating one or more directory pages to contain the root nodes of the file trees;
   determining a locality of files represented by the root nodes in the directory pages; and
   writing the directory pages as part of the namespace in a batch manner to the storage device only when the locality of the files represented by the directory pages satisfies the predetermined locality.

7. The method of claim 6, wherein the directory pages and the segments of the files are written to the storage device using an identical input and output (TO) stream, such that the directory pages and the segments of the files have a similar locality.

8. The method of claim 1, wherein generating a plurality of segments is performed via a first thread, wherein generating a plurality of file trees is performed via a second thread, wherein creating a namespace is performed via a third thread, and wherein the first thread, the second thread, and the third thread are executed substantially concurrently.

9. A non-transitory machine-readable medium having instructions stored therein, which when executed by a processor, cause the processor to perform operations, the operations comprising:
   receiving a request for seeding a predetermined number of files with a predetermined locality in a storage system, each of the files to have a predetermined file size;
   in response to the request, generating, by a segmenter executed by a processor, a plurality of segments and generating fingerprints of the segments;
   generating by a file tree manager executed by the processor a plurality of file trees representing the predetermined number of files respectively based on the fingerprints of the segments, each of the files represented by the segments having the predetermined file size;
   creating, by a directory page manager executed by the processor, a namespace representing one or more directories of the files based on the file trees, wherein each of the directories of files satisfies the predetermined locality; and writing the namespace and the segments corresponding to the files of one or more directories in a same I/O stream to a storage device of the storage system so to maintain a locality of the segments and a locality of the namespace, and so as to reduce the number of input/output transactions to the storage system such that the predetermined number of files can be written at a higher throughput than if written without seeding the files.

10. The non-transitory machine-readable medium of claim 9, wherein generating a plurality of segments comprises:
   generating a data set with a pattern so that the data set has a predetermined compression ratio, which is determined based on the request; and
   segmenting the data set using a predetermined segmenting algorithm to generate the plurality of segments.

11. The non-transitory machine-readable medium of claim 10, wherein the segments are generated from the data set to constitute the predetermined number of file, each having the predetermined file size.

12. The non-transitory machine-readable medium of claim 9, wherein each file tree comprises a plurality of nodes in a hierarchical structure having a plurality of levels, including a root node, one or more levels of intermediate nodes referenced by the root node, and a plurality of leaf nodes referenced by at least a portion of the intermediate nodes, wherein leaf nodes contain actual data of segments, and wherein the root node and the intermediate nodes contain metadata of their respective child nodes.

13. The non-transitory machine-readable medium of claim 12, wherein each root node represents one of the files, and wherein the root nodes are used to create a namespace of the files via a directory manager of a storage file system.

14. The non-transitory machine-readable medium of claim 12, wherein creating a namespace representing one or more directories of the files based on the file trees comprises:
   creating one or more directory pages to contain the root nodes of the file trees;
   determining a locality of files represented by the root nodes in the directory pages; and
   writing the directory pages as part of the namespace in a batch manner to the storage device only when the locality of the files represented by the directory pages satisfies the predetermined locality.

15. The non-transitory machine-readable medium of claim 14, wherein the directory pages and the segments of the files are written to the storage device using an identical input and output (TO) stream, such that the directory pages and the segments of the files have a similar locality.

16. The non-transitory machine-readable medium of claim 9, wherein generating a plurality of segments is performed via a first thread, wherein generating a plurality of file trees is performed via a second thread, wherein creating a namespace is performed via a third thread, and wherein the first thread, the second thread, and the third thread are executed substantially concurrently.

17. A data processing system, comprising:
   a processor;
   a memory coupled to the processor to store instructions, which when executed by the processor, cause the processor to perform operations, the operations including
      receiving a request for seeding a predetermined number of files with a predetermined locality in a storage system, each of the files to have a predetermined file size,
      in response to the request, generating, by a segmenter executed by a processor, a plurality of segments and generating fingerprints of the segments,
      generating by a file tree manager executed by the processor a plurality of file trees representing the predetermined number of files respectively based on the fingerprints of the segments, each of the files represented by the segments having the predetermined file size,
      creating, by a directory page manager executed by the processor, a namespace representing one or more directories of the files based on the file trees, wherein each of the directories of files satisfies the predetermined locality, and
      writing the namespace and the segments corresponding to the files of one or more directories in a same I/O stream to a storage device of the storage system so to maintain a locality of the segments and a locality of the namespace, and so as to reduce the number of input/output transactions to the storage system such that the predetermined number of files can be written at a higher throughput than if written without seeding the files.

18. The system of claim 17, wherein generating a plurality of segments comprises:
   generating a data set with a pattern so that the data set has a predetermined compression ratio, which is determined based on the request; and
   segmenting the data set using a predetermined segmenting algorithm to generate the plurality of segments.

19. The system of claim 18, wherein the segments are generated from the data set to constitute the predetermined number of file, each having the predetermined file size.

20. The system of claim 17, wherein each file tree comprises a plurality of nodes in a hierarchical structure having a plurality of levels, including a root node, one or more levels of intermediate nodes referenced by the root node, and a plurality of leaf nodes referenced by at least a portion of the intermediate nodes, wherein leaf nodes contain actual data of segments, and wherein the root node and the intermediate nodes contain metadata of their respective child nodes.

21. The system of claim 20, wherein each root node represents one of the files, and wherein the root nodes are used to create a namespace of the files via a directory manager of a storage file system.

* * * * *